United States Patent [19]

McKenna

[11] 4,016,349
[45] Apr. 5, 1977

[54] PROCESS FOR REMOVING VANADIUM RESIDUES FROM POLYMER SOLUTIONS

[75] Inventor: James Michael McKenna, Hockessin, Del.

[73] Assignee: E. I. Du Pont de Nemours and Company, Wilmington, Del.

[22] Filed: Oct. 30, 1975

[21] Appl. No.: 627,460

[52] U.S. Cl. .............................................. 528/482
[51] Int. Cl.² .......................................... C08F 6/08
[58] Field of Search ........ 260/94.9 F, 80.78, 88.25; 450/765.5; 528/482

[56] References Cited

UNITED STATES PATENTS

| | | | |
|---|---|---|---|
| 3,164,578 | 1/1965 | Baker et al. | 260/94.9 F |
| 3,281,399 | 10/1966 | Renaudo et al. | 260/88.2 S |
| 3,374,212 | 3/1968 | Marinak et al. | 260/88.2 S |
| 3,547,855 | 12/1970 | Loveless | 260/80.78 |
| 3,562,227 | 2/1971 | Di Drusco et al. | 260/80.78 |
| 3,600,463 | 8/1971 | Hagemeyer et al. | 260/94.9 F X |

Primary Examiner—William F. Hamrock

[57] ABSTRACT

Vanadium catalyst residues can be removed from solutions of organic solvents of homopolymers of α-olefins or their copolymers with hydrocarbon monomers by first contacting at a temperature of about room temperature to about 140° C. the polymer solutions with polar liquid extractants supported on an inert, finely divided, solid material, such as diatomaceous silica, silica gel, alumina, or molecular sieves, then separating the solution from the solid material. Water is the preferred polar liquid, and diatomaceous silica is the preferred supporting material. Polymers recovered from solutions treated according to the process of this invention have a much lesser proportion of vanadium contaminants than those recovered from untreated solutions. This vanadium removal process is simple and inexpensive.

16 Claims, No Drawings

PROCESS FOR REMOVING VANADIUM RESIDUES FROM POLYMER SOLUTIONS

BACKGROUND OF THE INVENTION

This invention relates to a process for removing vanadium residues from solutions of α-olefin homopolymers and copolymers with hydrocarbon monomers, which have been prepared in the presence of vanadium-based catalysts.

Homopolymerization and copolymerization of many α-olefins are known. For the purposes of the present disclosure, the term "polymerization" includes both homo- and copolymerization, and the term "polymer" includes both homo- and copolymers. Typical commercial polymers include polyethylene, EPDM rubber, and ethylene/propylene dipolymers (EPM rubber). In many α-olefin polymerization processes, a vanadium-based coordination catalyst is used. Coordination catalysts are well known in the polymer art as Ziegler catalysts. Vanadium-based catalysts are made by combining a vanadium compound, preferably one soluble in hydrocarbons, and a organometallic reducing compound of a metal of Groups I-III of the Periodic Table, preferably aluminum.

Polymerization is normally carried out in a liquid phase, often in solution in a saturated hydrocarbon, most often in a continuous system. The reactor effluent containing the polymer usually also contains various impurities, for example, spent catalyst residues and unchanged monomer. It is important to remove the vanadium residues from the polymer solution before the polymer is recovered because such residues, if present in the polymer, adversely affect its heat stability. Polymer can be isolated from solution by phase decantation, i.e., by heating the solution to a temperature at which the solution separates into two phases: a polymer-poor phase and a polymer-rich phase, from which polymer is recovered by flashing off residual solvent. This procedure, described in U.S. Pat. No. 3,726,843 to Anolick et al., produces a polymer containing a significant amount of vanadium impurities unless catalyst reactivation is employed during the polymerization. It is desirable to minimize the amount of vanadium residue in the polymer solution before phase decantation occurs. Vanadium removal is, similarly, usually desirable from polymer solutions which are to be subjected to steam vaporization, for example, as taught in U.S. Pat. No. 3,750,736 to Batt et al.

Various methods of removing vanadium from the polymers are known. For example, U.S. Pat. No. 3,271,372, to S. W. Caywood, Jr., discloses a process wherein an alcohol is added to an ethylene copolymer slurry in methylene chloride to disperse the granular particles of the copolymer and the copolymer is separated from the slurry. U.S. Pat. No. 3,337,514, to Knabeschuh et al., requires contacting a solution of an α-olefin copolymer with steam, then with aqueous mineral acid, then with water under turbulent conditions, and separating the copolymer solution from the aqueous phase. When water is mixed with a polymer solution, it is necessary to avoid emulsification because trapped water can lead to incomplete vanadium removal. Furthermore, emulsification can disturb the equilibrium in the above-mentioned phase decantation process. Other techniques are available but all have shortcomings in that complicated installations are required, and that normally other chemical compounds are introduced which then must be separated.

There is a need for a simple and efficient process for removing vanadium residues from α-olefin hydrocarbon polymer solutions, and especially a process suitable for continuous vanadium removal.

SUMMARY OF THE INVENTION

According to this invention, it has now been discovered that vanadium residues can be removed with high efficiency from a solution in an organic solvent of an α-olefin homopolymer or copolymer with one or more hydrocarbon monomers by first contacting said solution at a temperature of about room temperature to about 140° C. with a polar liquid capable of extracting dissolved vanadium compounds, and supported on a finely divided, inert, solid, material, then separating the solution from the solid material. A suitable polar liquid is one that has at least one functional group other than a carbon-carbon or carbon-hydrogen group, this functional group containing at least one oxygen, sulfur, nitrogen, or phosphorus atom; and when the liquid also contains carbon-carbon groups, it must have at least one such functional group for every eight carbon atons. The polar liquid must not be soluble in the polymer solvent to an extent of more than about 0.5 weight percent under process conditions.

DETAILED DESCRIPTION OF THE INVENTION

Any α-olefin homopolymers and copolymers with hydrocarbon monomers prepared in the presence of vanadium-based catalysts in solution in an inert solvent can be purified by the process of the present invention. These include, for example, polyethylene, polypropylene, EPM rubber, and ethylene/propylene/monoreactive nonconjugated diene copolymers (EPDM rubbers) in which the diene monomer can be among others 1,4-hexadiene, 5-ethylidene-2-norbornene, 5-(1-propenyl)-2-norbornene, 5-(2-butenyl)-2-norbornene, 2-ethyl-2,5-norbornadiene, and dicyclopentadiene. In addition to conventional EPDM rubbers, which are usually tripolymers, tetrapolymers of ethylene, propylene, a nonconjugated monoreactive diene, and a small amount of a nonconjugated direactive diene also are within the scope of the term "α-olefin copolymer". Such polymers may be thought of as a special class of EPDM rubbers. They are specifically described in U.S. Pat. No. 3,819,591 to Campbell and Thurn. The preferred copolymer of this class is an ethylene/propylene/1,4-hexadiene/norbornadiene copolymer. Furthermore, tetrapolymers of ethylene, propylene, and two nonconjugated monoreactive dienes are included within the term α-olefin copolymer". These are considered to be conventional EPDM rubbers, although less commonplace than tripolymers. Such polymers are described in U.S. Pat. Nos. 3,651,032 to Cameli and 3,554,988 to Emde et al. A typical such polymer would be, for example, an ethylene/propylene/1,4-hexadiene/5-ethylidene-2-norbornene copolymer. This invention is especially suitable for the purification of EPM and EPDM rubbers or other polymers before they are recovered from their solutions by phase decantation and evaporation of the solvent or by steam vaporization.

Any solvents conventionally used in polymerizations with Ziegler catalysts are suitable here. Preferably, they boil below about 150° C.

Preferred inert solvents are saturated hydrocarbons. These include alkanes, cycloalkanes, and alkylcycloalkanes. Typical solvents include, for example, hexane, isooctane, cyclohexane, cycloheptane, methylcyclohexane, and other hydrocarbons of those classes. These and similar hydrocarbons are well known to those skilled in the art and are commercially available. They can be linear, branched, cyclic substituted with one alkyl group or with two or more alkyl groups, or unsubstituted cyclic. They can be single hydrocarbons or mixtures of hydrocarbons, for example, mixtures of isomers or of homologs. Under moderate reaction conditions, certain halogenated hydrocarbons, e.g., perchloroethylene or methylene chloride can be used. Liquids containing active hydrogen preferably should be absent. Since the solution must be liquid at the operating temperature and pressure, the boiling and melting temperatures of the solvents will be chosen accordingly.

The polymer solution usually contains about 5–15% of polymer. The solvent often is hexane. It is necessary to have sufficient fluidity of the solution for contacting the solution with the extracting liquid to allow a good, controlled flow through the equipment used. The viscosity of the solution leaving the reactor in which monomers are polymerized may vary over a broad range, for example, 800–3500 cP.

The vanadium residues present in the solution are derived from a vanadium-based coordination catalyst. Polymerization of $\alpha$-olefins in the presence of Ziegler catalysts has been reviewed in such text as, for example: *Linear and Stereoregular Addition Polymers*, by N. G. Gaylord and H. F. Mark, Interscience Publishers, Inc., New York, N.Y., 1959, and *Polymerization by Organometallic Compounds*, by L. Reich and A. Schindler, Interscience Publishers, New York, N.Y., 1966. There also are many patents in this area, including U.S. Pat. No. 3,118,865 to Bruce, Jr., et al., U.S. Pat. No. 2,962,451 to Schreyer, and U.S. Pat. No. 3,218,266 to Ludlum. As stated above, vanadium catalysts are made by combining a vanadium compound with an organometallic, usually organoaluminum, compound. The vanadium component can be, for example, vanadium tetrachloride, vanadium trichloride, vanadium oxytrichloride, tetrakis($\beta$-ethoxyethoxy)vanadium, isopropyl vanadate, tris(p-chlorophenyl) vanadate, vanadium tris(acetylacetonate), and diethoxyvanadyl fluoride. Representative aluminum compounds include alkylaluminum chlorides, dichlorides, and sesquichlorides, such as diethylaluminum chloride, diisobutylaluminum dichloride, methylaluminum sesquichloride, ethylaluminum sesquichloride, and isobutylaluminum sesquichloride. Other organoaluminum compounds include diphenylaluminum chloride, triethylaluminum, triisobutylaluminum, and isoprenylaluminum.

Various polar liquids can be used to extract vanadium compounds from polymer solutions according to the process of the present invention. The solubility of the liquid in the polymer solvent should be as low as possible to avoid leaching from the support by polymer solvent, preferably less than 0.05% by weight. Solubility decreases with the increasing number of polar groups and/or a higher molecular weight of the liquid. The most practical and preferred polar liquid within the scope of the invention is water. Other polar liquids include various alcohols, ethers, esters, nitriles, sulfoxides, phosphoramides, and amines, provided they are sufficiently insoluble in the polymer solvent. Typical polar liquids that can be used in the present process include, for example, the following: water, polyvinyl alcohol; polyethylene glycol; polypropylene glycol; polytetramethylene glycol; tris(cyanoethoxy)propane; $\beta,\beta$-oxydipropionitrile; cyanoethyl sucrose; tetracyanoethylpentaerythritol; dimethylsulfoxide; sucrose acetate isobutyrate; hexamethylphosphoramide; polyethyleneimine; and tetraethylenepentamine.

An important feature of the present invention is the use of the polar liquid on a support. Preferably, the coating should be as uniform as possible. Low molecular weight liquids, such as water and dimethyl sulfoxide, can be mixed (by tumbling) directly with the support. Higher molecular weight liquids such as poly(ethyleneoxy)glycols, having a molecular weight of about 6000, are preferably dissolved in a solvent such as methylene chloride; the resulting solution is mixed with the support, and solvent is distilled off from the coated support.

The inert supporting material should have a large surface area. The particle size of the supporting material usually will be within the range of about 10–200 mesh. An effective and practical support is diatomaceous silica, e.g., 45–60 mesh. Many varieties of diatomaceous silica are available commercially, for example, Chromosorb (a product of Johns-Manville Corporation).

Diatomaceous silica can be loaded with fairly large amounts of water; for example, Chromosorb P can hold about 80% of its weight of water. This amount will vary to some extent with the type and particle size of the inert support material. Alternatives include silica gel, molecular sieves, and alumina.

Contacting the $\alpha$-olefin polymer solution with the supported polar liquid can be accomplished by any suitable technique. A technique that is particularly suitable for this purpose is percolation of the polymer solution through a bed of the inert, supporting material carrying the polar liquid phase. An installation similar to ordinary ion exchange installations is used. Preferably, the column is short and has a large diameter. The polymer solution can be introduced at the top or the bottom of the column.

It is immaterial whether the polymer solution is basic, neutral, or acidic. Vanadium in all its forms is removed by the process of the present invention. To remove vanadium from the column, one can wash the column or column material with, e.g., 20% sulfuric acid. In addition to vanadium, aluminum and titanium compounds also are recovered to a large extent.

In practical operation of the process, at least two columns or batteries of columns will be used. One of these will be operating in the vanadium extraction mode, while the other one is washed with a suitable liquid to remove extracted vanadium or is being recharged. Other means or techniques for contacting polymer solutions with a polar liquid on inorganic support also are possible. These include agitation in a tank or countercurrent contact of the polymer solution with a stream of inert supporting material coated with polar liquid.

The optimum operating temperature is about 60°–90° C. The extraction efficiency increases with temperature, but so does the solubility of the polar liquid in the polymer solvent, ultimately imparing the separation. Only low concentrations of water are permissible when a subsequent phase-decantation step is used. Some organic liquids which can be used in the process of the present invention would be particularly susceptible to leaching out at higher temperatures.

Before the polymer solution is allowed to contact the extractant material, unpolymerized monomers are preferably flashed off to reduce the pressure in the extraction column. After the extraction, traces of extracting liquid are normally found in the polymer solution. When non-volatile extracting liquids are used, they remain with the polymer after its isolation. Volatile extracting liquids are generally flashed off along with the polymerization solvent during polymer isolation.

This invention is now illustrated by the following representative examples of certain preferred embodiments thereof, where all parts, proportions, and percentages are by weight unless otherwise indicated. The vanadium concentrations are given in parts per million parts of dry polymer (ppm).

The EPDM polymers which were used in these Examples were prepared in a continuous reactor by polymerizing ethylene, propylene, and 1,4-hexadiene in hexane solution using a polymerization catalyst composed of either $VCl_4$ or $VOCl_3$ and an alkylaluminum chloride compound.

In all cases where fluctuations of vanadium levels in control samples are observed, it is believed that these fluctuations are due to the presence of some finely dispersed, in addition to the dissolved, vanadium compounds. Such dispersed vanadium compounds may settle at varying rates, depending, for example, on their particle size, the temperature, or the mechanical handling and agitation conditions.

EXAMPLE 1

The polymer was a tetrapolymer also containing norbornadiene and had been prepared with a $VCl_4$/diisobutylaluminum chloride catalyst. The hexane polymer solution from the reactor was flashed to remove most of the dissolved propylene. The solution was then collected in closed stainless steel cylinders. The solution was not exposed to the air. The concentration of polymer in the hexane solution was 3.9%.

The extractant, water supported on diatomaceous silica, was prepared by mixing 180 gm. of 45–60 mesh diatomaceous silica (Chromosorb P) and 160 gm. of water, and tumbling the mixture for several hours in a rotary evaporator at atmospheric pressure and room temperature. Then 60 gm. of this material was charged to a stainless steel column (2.5 cm. internal diameter and 22.8 cm. length). The column was equipped with screens on the ends to hold the packing in place. A heating coil was wrapped around the column, and a thermocouple was set up inside the column.

A total of 900 ml. of the polymer solution was transferred under nitrogen pressure to a stirred, jacketed, 1-liter pressure vessel. The polymer solution was then heated to 80° C. with stirring. After this time, 50 ml. of polymer solution was removed from the pressure vessel as a control sample.

The heated polymer solution was then passed upward through the stainless steel column containing the water on diatomaceous silica. A pressure control valve at the end of the column was used to maintain a 2-ml./min. flow rate through the column. The temperature of the column was maintained at 80° C., and the temperature of the pressure vessel was kept at 75° C. Four 80-ml. samples were collected. Then the flow rate was increased to 10 ml./min., and three more 80-ml. samples were collected. The pressure vessel and the column were then flushed with three 400-ml. portions of hexane at 80° C.

The samples from the experiment were placed in aluminum pans and the hexane was evaporated by heating on a steam bath. Then the samples were dried in a vacuum over at 80° for 16 hours. Some of the samples were analyzed for vanadium. The following results were obtained.

| Fraction Number | Flow Rate | Weight | Vanadium |
|---|---|---|---|
| Control | — | 1.7 gm. | 367 ppm |
| 1 | 2 ml./min. | 3.1 | — |
| 2 | '' | 3.1 | 8 |
| 3 | '' | 3.2 | — |
| 4 | '' | 3.2 | 14 |
| 5 | 10 ml./min. | 3.3 | — |
| 6 | '' | 3.6 | 102 |
| 7 | '' | 4.5 | — |

Sample 6 shows that vanadium removal is less efficient at higher flow rates.

EXAMPLE 2

A portion of the polymer solution of Example 1 was diluted with an equal volume of dry deoxygenated hexane and used as the column feed. The column material was 33.6 g. of 45–60 mesh diatomaceous silica, supporting 26.4 g. of water. The procedure of Example 1 was repeated except that the initial flow rate was 2.5 ml./min. at 90° C.; the subsequent flow rate was 6 ml./min. at 90° C.; and the final flow rate was 18 ml./min. at 75° C. The control sample showed 570 ppm of vanadium and contained some particulate vanadium compounds in addition to dissolved vanadium compounds; a sample obtained at the 2.5 ml./min. flow rate showed less than 1 ppm of vanadium; a sample obtained at the 6 ml./min. flow rate showed less than 1 ppm of vanadium; and a sample obtained at the 18 ml./min. flow rate showed 16 ppm of vanadium. It appears that the vanadium removal efficiency is improved by dilution and higher operating temperature.

EXAMPLE 3

Example 1 was repeated using a tripolymer solution which had been prepared in a manner similar to that described in Example 1. This polymer was prepared with the $VOCl_3$/isobutylaluminum sesquichloride catalyst system. The column material had the same composition as in Example 2. A flow rate of 5 ml./min. was used, and the temperature of the stirred pressure vessel and the column was 80°. After 400 ml. of solution has been passed through the column, more polymer solution was charged to the stirred pot and heated to 80°. This solution was then passed through the column. A total of 15 l. of polymer solution containing 313 gm. of polymer was treated in this way. The polymer solution was kept at 80° except for overnight shutdowns when it was allowed to cool to room temperature. A total of 33 samples of approximately 500 ml each were obtained. The products were worked up as described in Example 1, giving the following results.

| Sample No. | Vanadium |
|---|---|
| Control | 680 ppm. |
| 2 | 224 |
| 4 | 11 |
| Control | 563 |
| 7 | 12 |

-continued

| Sample No. | Vanadium |
| --- | --- |
| 10 | 14 |
| 13 | 15 |
| Control | 616 |
| 15 | 26 |
| Control | 752 |
| 18 | 25 |
| 21 | 61 |
| 24 | 74 |
| 27 | 63 |
| 30 | 93 |
| 31 | 87 |
| Control | 772 |

This experiment shows the high capacity of water supported on diatomaceous silica for removing vanadium from solution.

EXAMPLE 4

This example used an ethylene/propylene/1,4-hexadiene (68:28:4) copolymer solution (2.8% solids) prepared by the method of Example 3. The column material was 33.6 gm. of 45–60 mesh diatomaceous silica, supporting 26.4 gm. of 10% (v/v) sulfuric acid in water. The procedure of Example 1 was repeated using a flow rate of 5 ml./min. at 80°–90° C. The control sample analyzed for 804 ppm of vanadium, while the material which had been passed through the column had 4 ppm of vanadium. This example shows that an acidic aqueous extractant is effective for removing the vanadium.

EXAMPLE 5

Another portion of the polymer solution described in Example 4 was used. The column material was 33.6 gm. of 45–60 mesh diatomaceous silica supporting 26.4 gm. of a 10% (w/w) sodium hydroxide in water. The procedure of Example 1 was repeated, using an initial flow rate of 5 ml./min. and a final flow rate of 25 ml./min. at 75°–80° C. The control sample contained 282 ppm of vanadium; a sample obtained at the 5 ml./min. flow rate showed 5 ppm of vanadium; and a sample obtained at the 25 ml./min. flow rate showed 13 ppm of vanadium. This shows that a basic aqueous solution is effective for removing vanadium.

EXAMPLE 6

In this example, the column material was 60 gm. of 12–28 mesh silica gel [Grace PA-400], supporting 20 gm. of water. The procedure of Example 1 was repeated using a polymer solution which has been prepared in a similar manner to the polymer solution of Example 1. The flow rate was 5 ml./min. at 75°–90° C. The control sample showed 538 ppm of vanadium, while two samples which had been passed through the column showed 425 ppm and 183 ppm. In a subsequent experiment at 75°–90° C. using column packing of the same composition, the control sample showed 890 ppm and two samples which had been passed through the column showed 202 ppm and 185 ppm vanadium. Water supported on 12–28 mesh silica gel does remove vanadium, but not as effectively as water on 45–60 mesh diatomaceous silica.

EXAMPLE 7

In this example, the column material was 30.8 gm. of 45–60 mesh diatomaceous silica supporting 9.2 g. of a 1000 molecular weight polyethylene glycol [Carbowax 1000]. The procedure of Example 1 was repeated using a 3.7% polymer solution which had been prepared in a similar manner to the polymer of Example 1. In this experiment, the polymer solution was diluted with an equal volume of dry deoxygenated hexane before it was heated and passed through the column. The initial flow rate was 3 ml./min. at 100° C., and the final flow rate was 7 ml./min. at 85° C. The control sample showed 805 ppm of vanadium; a sample which was obtained at the 3 ml./min. flow rate showed 107 ppm of vanadium; and a sample which was obtained at the 7 ml./min. flow rate showed 150 ppm of vanadium. The infrared spectra of the samples which had been passed through the column showed that some of the polyethylene glycol had been removed from the column.

EXAMPLE 8

In this example, the column material was 30.8 g. of 45–60 mesh diatomaceous silica supporting 9.2 g. of a 6000 molecular weight polyethylene glycol [Carbowax 6000]. The procedure of Example 1 was repeated using a 2.3% polymer solution which had been prepared in a similar manner to the polymer of Example 1. In this experiment, the polymer solution was diluted with an equal volume of dry deoxygenated hexane before it was heated and passed through the column at a temperature of 85°–100° C., and at a flow rate of 4 ml./min. A sample of polymer isolated from the original polymer solution showed 841 ppm of vanadium. Three samples of polymer which had been passed through the column showed 9 ppm, 2 ppm, and 6 ppm of vanadium. The infrared spectra of the isolated polymer showed that only a small amount of the polyethylene glycol had been removed from the diatomaceous silica.

EXAMPLE 9

In this example, the column material was 30.8 gm. of 45–60 mesh diatomaceous silica supporting 9.2 gm. of triscyanoethoxypropane. The procedure of Example 1 was repeated using another portion of the same 3.9% polymer solution that was used for Example 1. The polymer solution was diluted with an equal volume of dry deoxygenated hexane before it was heated and passed through the column at a temperature of 90°–105° C. Initially, a flow rate of 1.5 ml./min. was used, while later in the experiment, a flow rate of 5 ml./min. was used. The control sample showed 336 ppm of vanadium. A sample which had been passed through the column at the slow flow rate contained 7 ppm of vanadium, while a sample which had been collected at the fast flow rate contained 16 ppm of vanadium. The isolated polymer samples had a greasy appearance, indicating that some of the triscyanoethoxypropane had been dissolved out of the column.

EXAMPLE 10

In this example, the column material was 30.8 gm. of 45–60 mesh diatomaceous silica supporting 9.2 g. of β,β-oxydipropionitrile. The procedure of Example 1 was repeated using another portion of the same 3.9% polymer solution that was used for Example 1. The polymer solution was diluted with an equal volume of dry deoxygenated hexane before it was heated and passed through the column at a temperature of 85°–105° C. Initially, a flow rate of 2.5 ml./min. was used, while later in the experiment, a flow rate of 8 ml./min. was used. The control sample showed 279 ppm of vanadium. A sample which had been passed through the column at the slow flow rate contained 4 ppm of vanadium, while a sample which had been collected at the fast flow rate contained 35 ppm of vanadium. The isolated polymer samples had a greasy appearance, indicating that some of the β,β-oxydipropionitrile had been dissolved out of the column.

EXAMPLE 11

In this example, the column material was 22.4 gm. of 45–60 mesh diatomaceous silica supporting 17.6 gm. of water. The procedure of Example 1 was repeated using a polymer solution which had been prepared in a similar manner to the polymer of Example 1. The polymer solution was diluted with an equal amount of dry deoxygenated hexane before it was heated and passed through the column at a temperature of 60° and at a flow rate of 3 ml./min. The control sample showed 463 ppm of vanadium, while samples which had been passed through the column showed 31 ppm, 16 ppm, and 13 ppm of vanadium.

EXAMPLE 12

The procedure of Example 11 was repeated, only the temperature of the system was 25°. Samples of polymer which had been passed through the column showed 327 ppm, 320 ppm, and 398 ppm of vanadium. These values, compared with the 463 ppm of vanadium obtained for the control sample of Example 11, showed that removal of vanadium at 25° is not as efficient as at a higher temperature.

I claim:

1. A process for removing vanadium residues from a solution in an organic solvent of an α-olefin homopolymer or copolymer with one or more hydrocarbon monomers, said process comprising with steps of first contacting said solution at a temperature of about room temperature to about 140° C. with a polar liquid capable of extracting dissolved vanadium compounds and soluble in the polymer solvent under the process conditions to an extent of at most 0.5 weight percent, said polar liquid being supported on a finely divided, inert, solid material; then separating said solution from said solid material;

with the provisos that:
1. the polar liquid has at least one functional group other than carbon-carbon or carbon-hydrogen groups, and contains at least one oxygen, sulfur, nitrogen, or phosphorus atom; and
2. when the polar liquid also contains carbon-carbon groups, there is present at least one such functional group for each eight carbon atoms.

2. The process of claim 1 wherein the polar liquid is soluble in the polymer solvent to an extent of at most 0.05 weight percent.

3. The process of claim 1 wherein the solid support is selected from diatomaceous silica, silica gel, molecular sieves, and alumina.

4. The process of claim 3 wherein the polar liquid is water.

5. The process of claim 4 wherein the solid support is diatomaceous silica.

6. The process of claim 1 wherein the polar liquid is an aqueous acid or an aqueous alkali.

7. The process of claim 1 wherein the polar liquid is selected from the class consisting of alcohols, ethers, esters, nitriles, sulfoxides, phosphoramides, and amines.

8. The process of claim 1 wherein the polymer is an ethylene/propylene copolymer.

9. The process of claim 8 wherein the polymer is an ethylene/propylene dipolymer.

10. The process of claim 8 wherein the polymer is a terpolymer of ethylene with propylene and a monoreactive nonconjugated diene.

11. The process of claim 10 wherein the diene is 1,4-hexadiene.

12. The process of claim 1 wherein the polymer is a tetrapolymer of ethylene with propylene, a nonconjugated monoreactive diene, and a nonconjugated, direactive diene.

13. The process of claim 12 wherein the monoreactive diene is 1,4-hexadiene and the direactive diene is norbornadiene.

14. The process of claim 1 wherein the contacting of the polymer solution with the polar liquid supported on the solid material is accomplished by allowing the polymer solution to flow through a column charged with the solid material supporting the polar liquid.

15. The process of claim 14 which is carried out at a temperature of about 60°–90° C.

16. The process of claim 1 wherein the finely divided, solid supporting material has a particle size of about 10–200 mesh.

* * * * *